United States Patent Office 3,263,837
Patented August 2, 1966

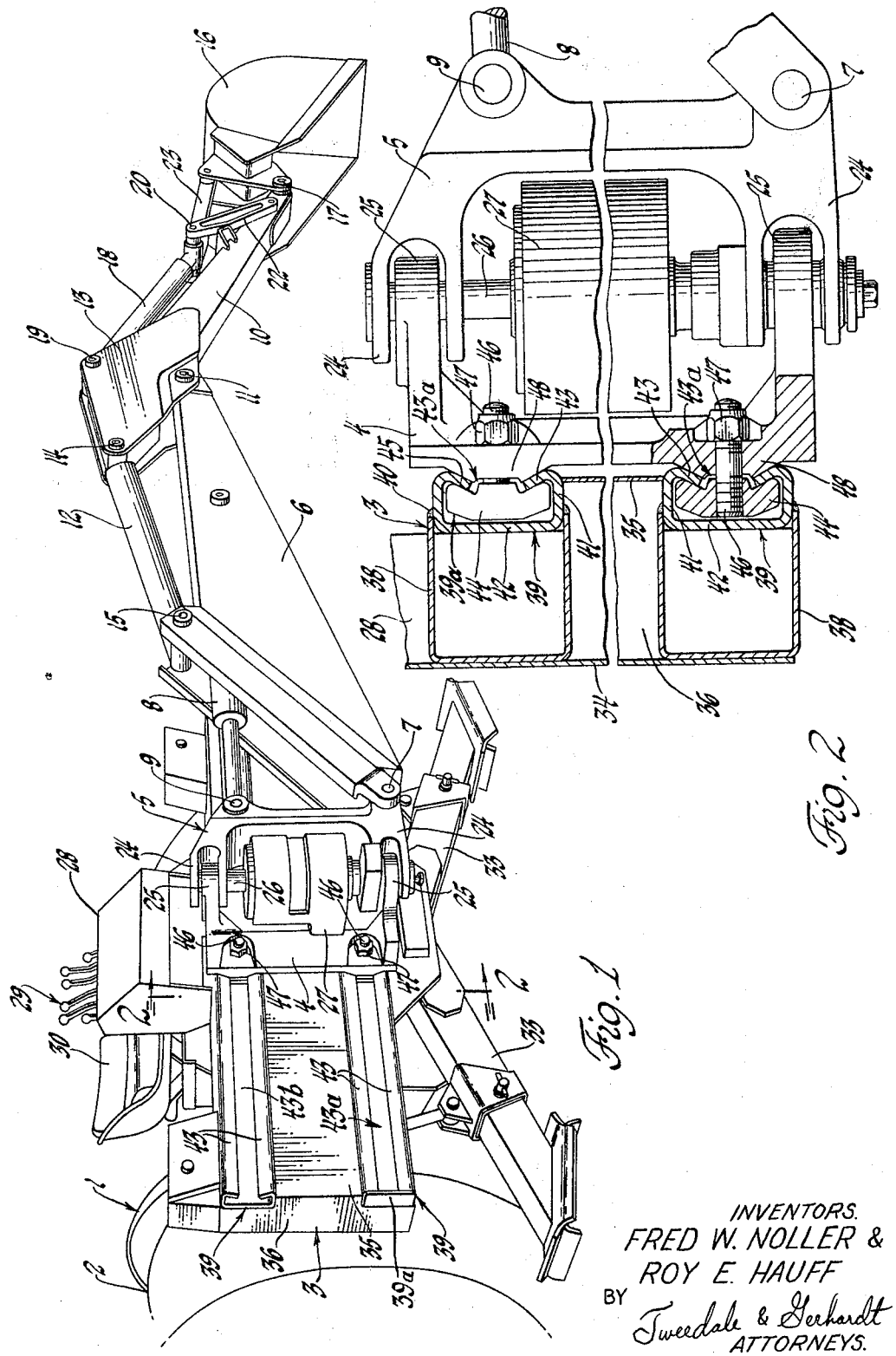

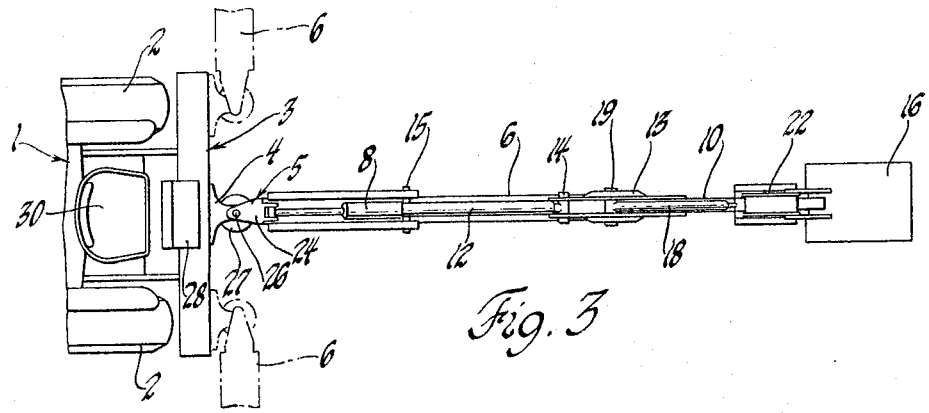
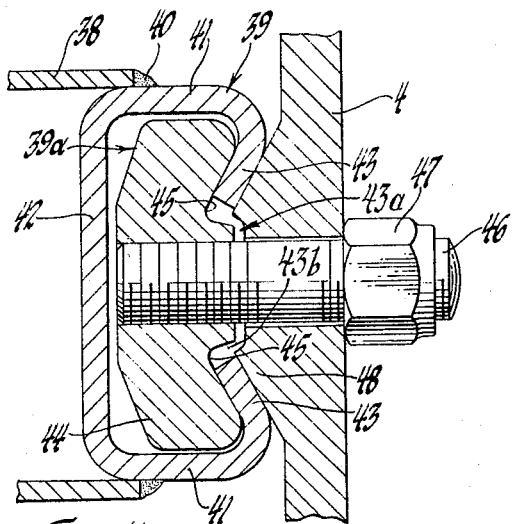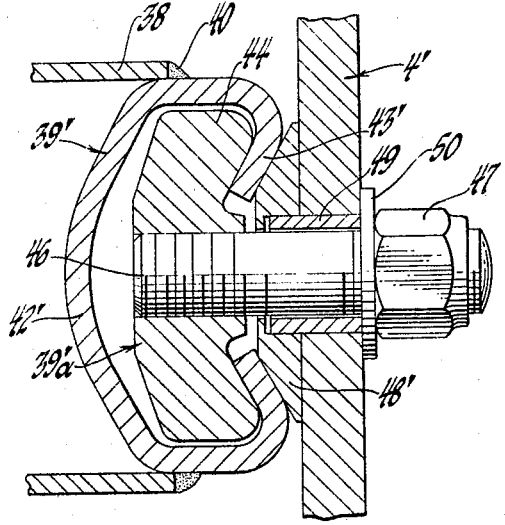
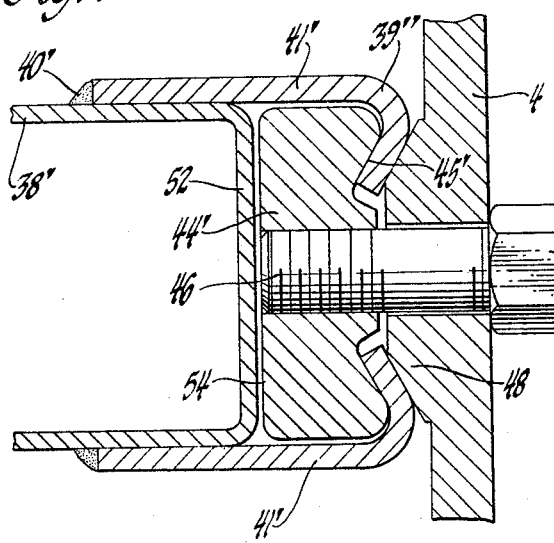
INVENTORS.
FRED W. NOLLER &
ROY E. HAUFF
BY Tweedale & Gerhardt
ATTORNEYS.

3,263,837
TRANSVERSELY ADJUSTABLE BOOM MOUNTING FOR EARTHWORKING APPARATUS
Fred W. Noller, Farmington, and Roy E. Hauff, St. Clair Shores, Mich., assignors to Massey-Ferguson Inc., Detroit, Mich.
Filed Feb. 15, 1965, Ser. No. 432,719
6 Claims. (Cl. 214—138)

This invention relates generally to mechanical shovels and similar earthworking equipment, and more particularly to vehicle mounted mechanical shovels of the type commonly referred to as "backhoes."

Until recently, the booms for backhoes and similar excavating equipment were carried at the longitudinal axis or center of the tractor or other vehicle with the boom mounted to swing about a vertical axis. With the boom centrally mounted on the vehicle, it is impossible for the shovel carried by the boom to be operated in a manner as to dig a narrow trench alongside buildings, foundations or fences since the portion of the vehicle extending transversely beyond the pivotal axis of the boom prevents the boom from being moved to a position immediately alongside and parallel to the building or fence.

Recently, boom mountings for backhoes have been developed which can be adjusted transversely to the longitudinal axis of the tractor to shift the vertical pivotal axis of the boom transversely of the vehicle longitudinal axis. One such apparatus is disclosed in U.S. Patent No. 3,117,685. The latter patent discloses a boom that can be adjusted transversely to one of a plurality of fixed positions determined by the locations of stop pins. The stop pins prevent undesired transverse movement of the boom along the supporting frame during digging operations at the sides of the tractor.

When the boom is swung to either side of the vertical pivotal axis, the bucket or shovel of the backhoe imposes high transverse loads on the boom mounting as the shovel digs into the earth. The transverse loads tend to move the boom support transversely on the supporting frame. Consequently, the boom support must be securely wedged or locked in each position on the supporting frame in order for the backhoes to perform properly, while at the same time, it is necessary for the operator to be able to shift the boom with a minimum amount of effort when desired.

It is therefore an object of this invention to provide a transversely adjustable boom support for backhoes and similar excavating apparatus in which the boom support can be shifted to any desired location along the length of a transverse supporting frame, and which can be firmly locked in position to resist transverse loads imposed on the boom by digging operations.

Another object is to provide a transversely adjustable boom support which is economical to manufacture, structurally efficient, and requires a minimum amount of skill and effort for its operation.

In achievement of the foregoing, and other objects, the present invention is embodied in a mounting assembly including a supporting frame mounted on a tractor or similar vehicle and extending transversely of the longitudinal axis. A pair of vertically spaced, parallel rail members are carried by the support frame. The rails are in the form of channel or C-shaped members having upper and lower, oppositely inclined flanges projecting from the rear edges of the upper and lower walls of the channel members to define a track. Slideably supported on the tracks is a boom support bracket having guide members formed thereon with complementary inclined surfaces for engaging the inclined flanges.

Slide members are received in each of the rails which are secured to the guide members of the boom support bracket by threaded shanks for clamping the boom support bracket against transverse movement along the track. The slide members are formed with inclined surfaces which engage the sides of the inclined flanges opposite the guide members of the boom support bracket. Threaded fasteners on the shanks may be tightened to securely wedge the guide members in any desired location along the track to prevent undesired movement of the boom support bracket along the track. Loosening of the fasteners permit the boom support bracket to be adjusted transversely of the frame member along the track. Thus, the inclined flanges, together with the slide members, cooperate to provide both vertical and transverse support for the boom support bracket and permit the boom to be adjusted transversely of the supporting frame merely by loosening the fasteners on the slide members.

Other objects, advantages and features of the invention will become apparent from the following description taken in connection with the accompanying drawings in which:

FIG. 1 is a perspective view of a tractor mounted backhoe incorporating the present invention;

FIG. 2 is a sectional view taken on line 2—2 of FIG. 1;

FIG. 3 is a plan view of the backhoe of FIG. 1 with the boom shown in alternate positions in phantom lines;

FIG. 4 is an enlarged sectional detail of the boom mounting of FIG. 2;

FIG. 5 is a view similar to FIG. 4 illustrating an alternate form of construction; and FIG. 6 is a view similar to FIG. 4 showing still another alternate form.

While specific examples of the invention are illustrated and described in the foregoing specification, it should be understood that the invention is not limited to the exact construction shown. On the contrary, all equivalents, alterations and modifications in the construction and arrangement of parts falling within the scope and spirit of the invention are intended to be covered herein.

In FIG. 1, reference numeral 1 designates the rear portion of a conventional tractor having rear wheels 2. Mounted on the tractor is a support frame 3 which lies in a transverse plane with respect to the longitudinal axis of vehicle 1. Mounted on frame 3 is a boom support bracket 4.

Mounted on bracket 4 for pivotal movement about a vertical axis is a C-shaped yoke 5 on which a boom 6 is mounted for pivotal movement about a horizontal pivot pin 7. Boom 6 is actuated about pivot pin 7 in a conventional manner by a hydraulic motor 8 pivotally connected to yoke 5 by a pin 9 in such a manner that by extending the hydraulic motor 8, boom 6 will pivot downwardly about pivot point 7 and conversely, upon retraction of hydraulic motor 8, boom 6 will pivot upwardly about pivot point 7.

The boom assembly further includes a dipper stick 10 extending from a lever 13 made up of a pair of platelike members. Dipper stick 10 is pivotally connected to the outer end of boom 6 by a pin 11. Lever 13 and dipper stick 10 are actuated about pivot point 11 by a hydraulic motor or ram 12 pivotally connected between boom 6 and lever 13 by pins 15 and 14, respectively.

Extension of hydraulic motor 12 causes lever 13 and the dipper stick 10 to pivot in a downward or clockwise direction about pivot point 11. Conversely, retraction of hydraulic motor 12 pivots the assembly in a counter-clockwise direction about pivot point 11.

A bucket or shovel 16 is pivotally mounted by a pin 17 on the outer end of dipper stick 10 and is actuated about pivot point 17 by a hydraulic motor 18 pivotally mounted by pins 19 and 20 to lever 13 and a pair of links 22 and 23, respectively. Hydraulic motor 18 extends and retracts to pivot bucket 16 about pin 17.

The yoke 5 is formed with upper and lower arms 24 which are bifurcated at their ends for receiving arms 25 of the boom support bracket 4 as shown in FIG. 2. The boom support bracket arms 25 are pivotally connected with the bifurcated arms 24 by means of the shaft 26 of a rotary motor 27. Actuation of motor 27 causes yoke 5 and the boom assembly to swing about the vertical axis of shaft 26.

Hydraulic motors 8, 12, 18 and 27 are energized hydraulically through flexible hydraulic conduits (not shown) control levers 29 mounted on a control console 28 supported on frame 3 as shown in FIG. 1. Control levers 29 are manipulated by the operator seated on seat 30 of the tractor which is shown in its rearwardly facing position for digging operations. The operator also controls the position of stabilizing legs 33 with respect to the tractor by means of control levers 29.

As shown in FIGS. 1, 2 and 3, support frame 3 is made up of spaced front and rear panels 34 and 35, respectively, connected together by end panels 36. Extending along the upper and lower edges of rear panel 35 are C-shaped beams 38. Mounted between the outer, free ends of the horizontal legs of beams 38 are rail members 39 which are secured to the beams by welding or other conventional means as indicated by reference numeral 40.

Rails 39 are of channel or C-shaped cross section having upper and lower horizontal walls 41 joined at their forward ends by a vertical wall 42 (FIG. 4) to define an elongated recess 39a throughout the length of the rails. Projecting from the rear edges of upper and lower walls 41 opposite the vertical wall 42 are opposed, inwardly inclined flanges 43 which cooperate to define a track 43a (FIG. 1). Track 43a communicates with the elongated recess 39a through a slot 43b defined by the space between the opposed edges of the inclined flanges 43.

Slideably received in recess 39a of each of rails 39 is a slide member 44 having upper and lower, outwardly inclined surfaces 45 engageable with the inner walls of the flanges 43. Projecting from each of slide members 44 is a pair of threaded shanks 46 which, in the illustrated embodiments, are threadedly engaged with slide members 44.

Projecting forwardly from the boom support bracket 4 is a pair of vertically spaced guide members 48 each having upper and lower, oppositely tapered or inclined surfaces engageable with the inclined flanges 43 for supporting the boom support bracket in tracks 43a. The shanks or bolts 46 are received in openings formed in the guide members 48 and the assembly is secured together by nuts or other fasteners 47 threadedly mounted on the outer or rear end of bolts 46. When nut 47 is tightened onto bolt 46, guide member 48 is wedged between the upper and lower oppositely inclined surfaces of track 43a, and flanges 43 are clamped between the opposed surfaces of slide member 44 and guide member 48. The boom support bracket 4 can be shifted along tracks 43a by loosening the four nuts 47.

Movement of boom support bracket 4 along the tracks can be accomplished hydraulically by swinging the boom to the position shown in phantom lines in FIG. 3 and anchoring the bucket 16 into the ground. Thereafter, hydraulic motors 8 and 12 can be actuated to extend or retract the boom to cause bracket 4 to slide along the tracks in the desired direction. With the bucket 16 anchored into the ground in the position shown in phantom lines in FIG. 3, the operator either jacknifes the boom so as to slide the bracket along the tracks toward the shovel or extends the boom so as to slide the bracket away from the shovel Alternatively, the boom can be extended rearwardly of frame 3 and the shovel driven into the ground to provide an anchor point. Actuation of the rotary motor 27 will cause the bracket to shift transversely along tracks 43a in the desired direction depending upon which direction the motor is operated by the operator. When the desired position is reached, nuts 47 are again tightened to anchor the boom support bracket 4 in position on frame 3 and the bucket is then ready for operation.

The upper and lower inclined surfaces of the track 43a provide both vertical and horizontal support for the boom support bracket with respect to the ground. The upper and lower flanges of the tracks provide vertical support when the boom is being shifted along the tracks. In effect a double wedge is provided by the mounting parts. In a typical design, 600 foot pounds of torque on nuts 47 will resist 25,000 pounds of transverse force imposed by the bucket and tending to slide the boom support bracket along the length of tracks 43a. The latter figures are given by way of example only and are not to be construed in a limited sense.

In order to prevent the boom support bracket 4 from being inadvertently pushed off of tracks 43a, opposite ends of rails 39 may be closed as indicated in 39a in FIG. 1. In the illustrated embodiment, as viewed in FIG. 1, the left end of the lower rail 39 is closed and the right end (not shown) of the upper rail 39 is closed.

FIG. 5 illustrates a modified construction wherein parts identical with the previously described embodiment are designated by the same reference numerals, and parts differing in construction are designated by primed reference numerals. Rail member 39' is provided with a bowed wall portion 42' connecting the upper and lower horizontal sections of a track. The integral guide member 48 on the boom support bracket 4 has been eliminated and a conical washer 48' substituted therefor as shown in FIG. 5. The conical washer 48' serves as the guide member for the boom support bracket and may be of hardened steel or other wear-resistant material eliminating the necessity of localized hardening of the metal of bracket 4 in the embodiment of FIG. 4. Similarly, a bushing 49 is provided in a suitable opening in boom support bracket 4' for supporting bolt 46, and a washer 50 is supported on the bolt between bracket 4' and nut 47.

In FIG. 6, beam 38' is formed with a rear vertical wall 52 at the outer ends of its upper and lower horizontal leg portions. The upper and lower walls 41' of rail member 39" extend over the horizontal portions of the beam and are welded as shown at 40'. Slide member 44' is formed with a straight wall 54 opposite the inclined surfaces 45' which cooperate with the flanges of the track.

While specific embodiments of the invention have been illustrated and described, it will be understood by those skilled in the art that other forms may be adopted without departing from the scope and spirit of the invention which is defined in the appended claims.

We claim:

1. A boom support assembly for brackhoes and the like comprising a frame adapted to be transversely mounted on a tractor, said frame having spaced, parallel front and rear panels joined at their edges by end panels, said end panels extending beyond the upper and lower edges of said rear panel, a pair of vertically spaced, horizontal rail members mounted on said frame and extending along the upper and lower edges of said rear panel, each of said rail members having a pair of upper and lower, oppositely inclined flanges lying in converging planes and defining a track, a longitudinal recess in each of said rails, a slide member in each of said recesses having a pair of shanks projecting from said recess through the space between said inclined flanges, said slide members each having oppositely inclined surfaces complementary with the inclined flanges, a boom support bracket having a pair of vertically spaced, apertured guide members with oppositely inclined surfaces complementary to the oppositely inclined surfaces of said tracks and engaged with the track on the opposite side thereof from said slide members, said shanks being received in the apertures of said guide members, and fastening means on said shanks operable to selectively draw said slide and guide members toward each other to lock the boom support bracket in any selected position on said tracks, said fastening means being operable to permit said guide and slide members to slide along said track upon loosening thereof.

2. The construction of claim 1 further including upper and lower beam members extending between said end panels adjacent the upper and lower edges of said rear panel, said rail members each being secured to one of said beam members and at least part of said rail members being disposed forwardly of said rear panel.

3. In earthworking apparatus of the type wherein a boom is pivotally carried by a boom support bracket mounted in a horizontal track member formed in a supporting frame for sliding movement along the track member such that the boom may be selectively adjusted along the length of the track and secured in position against sliding movement, the improvement wherein said track member is defined by means having spaced upper and lower surfaces defining a horizontal slot therebetween, and a slide member is slidably mounted in said track, said slide member having upper and lower surfaces engageable, respectively, with the upper and lower surfaces of the track member, and including adjustable clamping means projecting through said slot and securing said slide member to said boom support bracket and wherein the upper and lower surfaces of at least one of said slide and track members are oppositely inclined such that tightening of said adjusting means wedges said inclined surfaces of said one member against the other of said members to restrain the boom support bracket against movement from its selected position along the length of the track, said clamping means being releasable to permit said boom support bracket and slide member to slide along said track.

4. The construction defined in claim 3 wherein said track member comprises a horizontal rail member of generally C-shaped cross section having oppositely inclined flanges defining said upper and lower inclined surfaces.

5. The construction of claim 4 wherein said slide member is formed with oppositely inclined surfaces complementary to and engaged with said inclined flanges, and wherein said clamping means comprises a shank secured to said slide member and projecting through said slot into adjustable engagement with said boom support bracket.

6. The construction of claim 5 further including a guide member on said bracket having upper and lower inclined surfaces engaged respectively with the upper and lower inclined surfaces of said track member on the opposite sides thereof from said slide member such that when the clamping means is tightened, the track flanges are clamped between the slide and guide members.

References Cited by the Examiner

UNITED STATES PATENTS

| 1,751,691 | 3/1930 | Flath | 248—285 |
| 3,117,685 | 1/1964 | Davis | 214—138 |

FOREIGN PATENTS

| 216,128 | 11/1909 | Germany. |

HUGO O. SCHULZ, *Primary Examiner.*